US011120255B2

(12) United States Patent
Lu et al.

(10) Patent No.: US 11,120,255 B2
(45) Date of Patent: Sep. 14, 2021

(54) SYSTEMS AND METHODS FOR A MULTIFACTOR USER IDENTIFICATION AND AUTHENTICATION FRAMEWORK FOR IN-AIR-HANDWRITING WITH HAND GEOMETRY AND DEEP HASHING

(71) Applicants: Duo Lu, Tempe, AZ (US); Dijiang Huang, Tempe, AZ (US)

(72) Inventors: Duo Lu, Tempe, AZ (US); Dijiang Huang, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 108 days.

(21) Appl. No.: 16/781,596

(22) Filed: Feb. 4, 2020

(65) Prior Publication Data

US 2020/0250413 A1    Aug. 6, 2020

Related U.S. Application Data

(60) Provisional application No. 62/802,070, filed on Feb. 6, 2019, provisional application No. 62/802,028, filed on Feb. 6, 2019.

(51) Int. Cl.
*G06K 9/00* (2006.01)
*G06F 3/01* (2006.01)
(Continued)

(52) U.S. Cl.
CPC ......... *G06K 9/00375* (2013.01); *G06F 3/017* (2013.01); *G06F 16/2255* (2019.01);
(Continued)

(58) Field of Classification Search
CPC ............ G06K 9/00375; G06K 9/6215; G06K 9/00899; G06K 9/6277; G06K 9/6271; G06K 9/224; G06K 9/00355; G06K 9/6293; G06K 9/00402; G06K 9/4628; G06K 9/00422; G06K 9/222; G06K 9/46; G06K 9/6272; G06K 9/00892; G06K 2009/00328; G06K 9/00268; G06K 9/00154; G06K 17/00; G06K 19/06; G06K 19/07733; G06K 19/10; G06K 2019/06271; G06K 7/0004;
(Continued)

(56) References Cited

U.S. PATENT DOCUMENTS 8,837,738 B2    9/2014  Huang et al.
9,160,761 B2    10/2015 Lee et al.
(Continued)

FOREIGN PATENT DOCUMENTS

WO    2014160479 A1    10/2014

OTHER PUBLICATIONS

Abadi et al., "Tensorflow: A system for large-scale machine learning," in Proceedings of the 12th USENIX Symposium on Operating Systems Design and Implementation (OSDI). Savannah, Georgia, USA, 2016.

(Continued)

*Primary Examiner* — Nimesh Patel
(74) *Attorney, Agent, or Firm* — Polsinelli PC

(57) ABSTRACT

Various embodiments of a framework for user authentication based on finger motion signal and hand geometry matching are disclosed herein.

20 Claims, 13 Drawing Sheets
(13 of 13 Drawing Sheet(s) Filed in Color)

(51) Int. Cl.
  G06K 9/62 (2006.01)
  H01P 1/20 (2006.01)
  G06F 16/22 (2019.01)
  H04L 9/06 (2006.01)
  G06N 3/08 (2006.01)
  G06F 21/31 (2013.01)

(52) U.S. Cl.
  CPC ........... *G06F 21/31* (2013.01); *G06K 9/6215* (2013.01); *G06N 3/08* (2013.01); *H01P 1/20* (2013.01); *H04L 9/0643* (2013.01)

(58) Field of Classification Search
  CPC .. G06F 3/017; G06F 2221/2111; G06F 21/32; G06F 3/04883; G06F 3/03545; G06F 3/04886; G06F 3/041; G06F 21/31; G06F 3/014; G06F 21/50; G06F 3/011; G06F 3/0484; G06F 16/2255; G06F 19/00; G06F 3/0426; G06F 17/15; G06F 17/18; G06F 7/582; G06F 9/548; G06F 16/2365; G06F 21/44; G06F 21/554; G06F 3/016; G06F 3/0233; G06N 3/0445; G06N 3/0454; G06N 3/084; G06N 20/10; G06N 20/20; G06N 3/08; H04L 63/0861; H04L 9/3231; G06Q 40/02; G06Q 10/06; G06Q 10/10; G06Q 10/087; G06Q 10/20; G06Q 20/353; G06Q 30/0222; G06Q 30/04; G06Q 40/125
  See application file for complete search history.

(56) References Cited

U.S. PATENT DOCUMENTS

| | | | | |
|---|---|---|---|---|
| 9,355,236 | B1* | 5/2016 | Kratz | G06F 21/31 |
| 9,357,331 | B2 | 5/2016 | Huang | |
| 9,705,850 | B2 | 7/2017 | Huang et al. | |
| 10,419,404 | B2 | 9/2019 | Huang et al. | |
| 10,425,411 | B2 | 9/2019 | Huang | |
| 2013/0148024 | A1* | 6/2013 | Shin | H04N 21/441 348/552 |
| 2016/0188205 | A1* | 6/2016 | Rao | H04L 63/08 715/773 |
| 2016/0241399 | A1 | 8/2016 | Huang et al. | |
| 2018/0115470 | A1 | 4/2018 | Huang et al. | |
| 2020/0201443 | A1* | 6/2020 | Huang | G06F 21/31 |
| 2020/0322142 | A1 | 10/2020 | Huang et al. | |

OTHER PUBLICATIONS

Amma et al., "Airwriting: a wearable handwriting recognition system," Personal and ubiquitous computing, vol. 18, No. 1, 2014.
Aslan et al., "Mid-air authentication gestures: an exploration of authentication based on palm and finger motions," in Proceedings of the 16th International Conference on Multimodal Interaction. ACM, 2014, pp. 311-318.
Bailador et al., "Analysis of pattern recognition techniques for in-air-signature biometrics," Pattern Recognition, vol. 44, No. 10, pp. 2468-2478, 2011.
Bashir et al., "Person authentication with rdtw based on handwritten pin and signature with a novel biometric smart pen device," in Computational Intelligence in Biometrics: Theory, Algorithms, and Applications, 2009. CIB 2009. IEEE Workshop on. IEEE, 2009, pp. 63-68.
Biddle et al., "Graphical passwords: Learning from the first twelve years," ACM Computing Surveys (CSUR), vol. 44, No. 4, p. 19, 2012.
Bonneau et al., "The quest to replace passwords: A framework for comparative evaluation of web authentication schemes," in 2012 IEEE Symposium on Security and Privacy. IEEE, 2012.
Cappelli et al., "Performance evaluation of fingerprint verification systems," IEEE transactions on pattern analysis and machine intelligence, vol. 28, No. 1, pp. 3-18, 2006.
Chahar et al., "A leap password based verification system," in IEEE 7th International Conference on Biometrics Theory, Applications and Systems (BTAS). IEEE, 2015.
Chan et al.,"Leap motion controller for authentication via hand geometry and gestures," in International Conference on Human Aspects of Information Security, Privacy, and Trust. Springer, 2015.
Chaos computer club breaks apple touchid, http://www.ccc.de/en/updates/2013/ccc-breaks-apple-touchid, accessed Oct. 8, 2016.
Chollet, "Xception: Deep learning with depthwise separable convolutions," arXiv preprint arXiv:1610.02357, 2016.
Clark et al., "Engineering gesture-based authentication systems," IEEE Pervasive Computing, vol. 14, No. 1, pp. 18-25, 2015.
Daugman, "New methods in iris recognition," IEEE Transactions on Systems, Man, and Cybernetics, Part B, vol. 37, No. 5, pp. 1167-1175, 2007.
Diaz et al., "Evaluation of ahrs algorithms for inertial personal localization in industrial environments," in Industrial Technology (ICIT), 2015 IEEE International Conference on. IEEE, 2015, pp. 3412-3417.
Eastlake et al., "Rfc 4086-randomness requirements for security," 2011.
Farella et al., "Gesture signature for ambient intelligence applications: a feasibility study," in International Conference on Pervasive Computing. Springer, 2006, pp. 288-304.
Florencio et al., "A large-scale study of web password habits," in Proceedings of the 16th international conference on World Wide Web. ACM, 2007, pp. 657-666.
Frank et al., "Touchalytics: On the applicability of touchscreen input as a behavioral biometric for continuous authentication," IEEE transactions on information forensics and security, vol. 8, No. 1, pp. 136-148, 2013.
Gafurov et al., "Arm swing as a weak biometric for unobtrusive user authentication," in Intelligent Information Hiding and Multimedia Signal Processing, 2008. IIHMSP'08 International Conference on. IEEE, 2008, pp. 1080-1087.
Gong et al., "Forgery-resistant touch-based authentication on mobile devices," in Proceedings of the 11th ACM on Asia Conference on Computerand Communications Security. ACM, 2016, pp. 499-510.
Hayashi et al., "Wave to me: user identification using body lengths and natural gestures," in Proceedings of the 32nd annual ACM conference on Human factors in computing systems. ACM, 2014, pp. 3453-3462.
He et al., "Deep residual learning for image recognition," in Proceedings of the IEEE conference on computer vision and pattern recognition, 2016, pp. 770-778.
Hi5 VR Glove, https://hi5vrglove.com/, accessed: Nov. 25, 2017.
Hong et al., "Waving authentication: your smartphone authenticate you on motion gesture," in Proceedings of the 33rd Annual ACM Conference Extended Abstracts on Human Factors in Computing Systems. ACM, 2015, pp. 263-266.
HTC Vive, https://www.vive.com/US/, accessed: Nov. 25, 2017.
Impedovo et al., "Automatic signature verification: the state of the art," IEEE Transactions on Systems, Man, and Cybernetics, Part C (Applications and Reviews), vol. 38, No. 5, pp. 609-635, 2008.
Itaguchi et al., "Writing in the air: Contributions of finger movement to cognitive processing," PloS one, vol. 10, No. 6, p. e0128419, 2015.
Ives et al., "The domino effect of password reuse," Communications of the ACM, vol. 47, No. 4, pp. 75-78, 2004.
Kingma et al., "Adam: A method for stochastic optimization," arXiv preprint arXiv:1412.6980, 2014.
Klemmer et al., "How bodies matter: five themes for interaction design," in Proceedings of the 6th conference on Designing Interactive systems. ACM, 2006, pp. 140-149.
Krizhevsky et al., "Imagenet classification with deep convolutional neural networks," in Advances in neural information processing systems, 2012, pp. 1097-1105.
Lee et al., "Access to an automated security system using gesture-based passwords," in 2012 15th International Conference on Network-Based Information Systems. IEEE, 2012, pp. 760-765.

(56) References Cited

OTHER PUBLICATIONS

Lester et al., ""are you with me?"-using accelerometers to determine if two devices are carried by the same person," in International Conference on Pervasive Computing. Springer, 2004.
Liu et al., "uwave: Accelerometer-based personalized gesture recognition and its applications," Pervasive and Mobile Computing, vol. 5, No. 6, pp. 657-675, 2009.
Lu et al., "A data driven in-air-handwriting biometric authentication system," in International Joint Conf, on Biometrics (IJCB 2017). IEEE, 2017.
Lu et al., "Fmhash: Deep hashing of in-air-handwriting for user identification," arXiv preprint arXiv:1806.03574, 2018.
Lu et al., "Multifactor user authentication with in-air-handwriting and hand geometry," in 2018 International Conference on Biometrics (ICB). IEEE, 2018.
Ma et al., "Password entropy and password quality," in Network and System Security (NSS), 2010 4th International Conference on. IEEE, 2010, pp. 583-587.
Mayrhofer et al., "Shake well before use: Authentication based on accelerometer data," in International Conference on Pervasive Computing. Springer, 2007, pp. 144-161.
Microsoft HoloLens, https://www.microsoft.com/microsoft-hololens/en-US, accessed: Feb. 1, 2017.
Microsoft Kinect, https://developer.microsoft.com/en-us/windows/kinect, accessed: Nov. 25, 2017.
Moazen et al., "Airdraw: Leveraging smart watch motion sensors for mobile human computer interactions," in Consumer Communications & Networking Conference (CCNC), 13th IEEE Annual. IEEE, 2016.
Nassi et al., "Handwritten signature verification using hand-worn devices," arXiv preprint arXiv:1612.06305, 2016.
O'Gorman, "Comparing passwords, tokens, and biometrics for user authentication," Proceedings of the IEEE, vol. 91, No. 12, pp. 2021-2040, 2003.
Okumura et al., "A study on biometric authentication based on arm sweep action with acceleration sensor," in 2006 International Symposium on Intelligent Signal Processing and Communications. IEEE, 2006, pp. 219-222.
Openpose: Real-time multi-person keypoint detection library for body, face, and hands, URI: https://github.com/CMU-Perceptual-Computing-Lab/openpose.
Parkhi et al., "Deep face recognition." in BMVC, vol. 1, No. 3, 2015, p. 6.
Patel et al., "A gesture-based authentication scheme for untrusted public terminals," in Proceedings of the 17th annual ACM symposium on User interface software and technology. ACM, 2004.
Piekarczyk et al., "On using palm and finger movements as a gesture-based biometrics," in Intelligent Networking and Collaborative Systems (INCOS), 2015 International Conference on. IEEE, 2015, pp. 211-216.
Project Soli—Google ATAP, https://atap.google.com/soli/, accessed: Nov. 25, 2017.
Qu et al., "Online kinect handwritten digit recognition based on dynamic time warping and support vector machine," Journal of Information & Computational Science, vol. 12, No. 1, 2015.
Renuka et al., "Online hand written character recognition using digital pen for static authentication," in Computer Communication and Informatics (ICCCI), 2014 International Conference on. IEEE, 2014, pp. 1-5.
Sajid et al., "Vsig: Hand-gestured signature recognition and authentication with wearable camera," in Information Forensics and Security (WIFS), 2015 IEEE International Workshop on. IEEE, 2015, pp. 1-6.
Srivastava et al., "Dropout: a simple way to prevent neural networks from overfitting." Journal of Machine Learning Research, vol. 15, No. 1, pp. 1929-1958, 2014.
Talon, the smart ring, https://www.titaniumfalcon.com/, accessed: Nov. 25, 2017.
Tian et al., "Kinwrite: Handwriting-based authentication using kinect." in NDSS, 2013.
Wen et al., "A discriminative feature learning approach for deep face recognition," in European Conference on Computer Vision. Springer, 2016, pp. 499-515.
Wen et al., "Serendipity: Finger gesture recognition using an off-the-shelf smartwatch," in Proceedings of the 2016 CHI Conference on Human Factors in Computing Systems. ACM, 2016, pp. 3847-3851.
Wu et al., "Dynamic time warping for gesture-based user identification and authentication with kinect," in 2013 IEEE International Conference on Acoustics, Speech and Signal Processing. IEEE, 2013.
Yang et al., "Free-form gesture authentication in the wild," in Proceedings of the 2016 CHI Conference on Human Factors in Computing Systems. ACM, 2016, pp. 3722-3735.
Zaharis et al., "User authentication method and implementation using a three-axis accelerometer," in International Conference on Mobile Lightweight Wireless Systems. Springer, 2010, pp. 192-202.
Zhang et al., "The security of modern password expiration: An algorithmic framework and empirical analysis," in Proceedings of the 17th ACM conference on Computer and communications security. ACM, 2010, pp. 176-186.
Zhang et al., "Tomo: Wearable, low-cost electrical impedance tomography for hand gesture recognition," in Proceedings of the 28th Annual ACM Symposium on User Interface Software & Technology. ACM, 2015.

\* cited by examiner

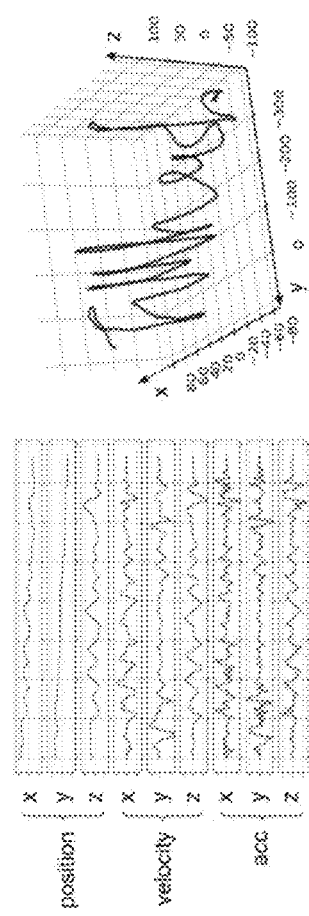
FIG. 16A
FIG. 16B
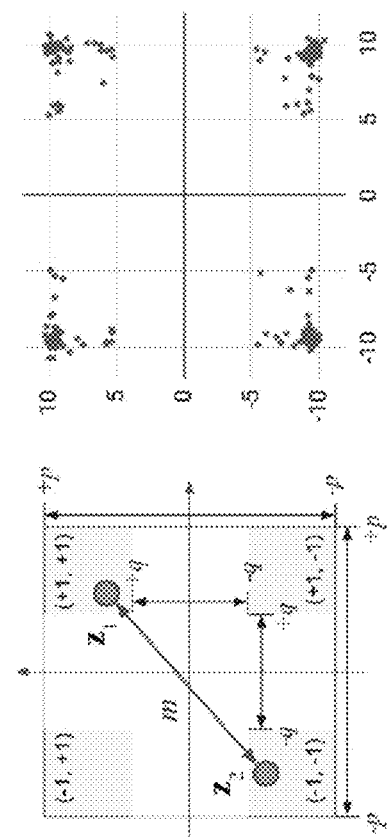
FIG. 17A
FIG. 17B

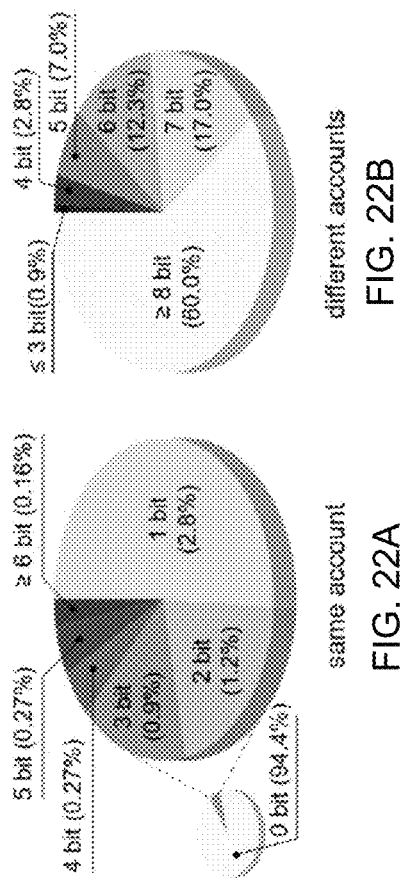

SYSTEMS AND METHODS FOR A MULTIFACTOR USER IDENTIFICATION AND AUTHENTICATION FRAMEWORK FOR IN-AIR-HANDWRITING WITH HAND GEOMETRY AND DEEP HASHING

CROSS-REFERENCE TO RELATED APPLICATIONS

This is a non-provisional application that claims benefit to U.S. provisional application Ser. No. 62/802,070 filed on Feb. 6, 2019 and U.S. provisional application Ser. No. 62/802,028 filed on Feb. 6, 2019, which are herein incorporated by reference in their entirety.

FIELD

The present disclosure generally relates to a user login framework; and in particular, to a three-dimensional in-the-air finger motion based user login framework for gesture interface which tracks finger motion and hand geometry of the user.

BACKGROUND

Virtual Reality (VR) headsets, wearable computers, and other mobile computing platforms with gesture input interface are gaining popularity. Meanwhile, it is necessary to verify the identity of a user to unlock these devices or log in onto a remote "virtual site" to access private data or personalized services. In such an environment, presenting a keyboard or touchscreen is usually impractical, while gesture and hand geometry based authentication would be efficient and favorable. For example, VR game consoles (e.g., Sony PSVR) and wearable computing platforms (e.g., Microsoft Hololens) are operated through a native gesture user interface.

A lot of existing research exploits the rich information in native gestures, and especially, in-air-handwriting, to authenticate a user to access an account. Yet, for a login system, there are two components: user authentication and user identification. The former is equivalent to checking a password, i.e., verify whether the person generating this login request is the legitimate user that owns the account, which is answering "yes" or "no". The latter is equivalent to type an ID string, i.e., search the account database and locate the target account to login, which is answering "which account do you want to login". A usually neglected function in existing works with gesture or in-air-handwriting is the user identification. Compared to gesture based user authentication, the user identification task is more challenging due to a few unique characteristics of the gesture. First, gestures have inherent fuzziness. Even if the same user writes the same string in the air twice, the generated two signals are not identical but contain minor variations. Yet, the system should be able to tolerate the fuzziness and identify the two signals as the same user, unlike typing an ID string of characters twice where not a single bit difference is tolerated. Second, it is difficult for many native gestures to provide enough information to enable a large account ID space as well as distinctiveness. Third, given the fuzziness of the gesture, it is challenging to design an efficient index of the gesture patterns of all users or accounts to enable fast identification. Another fact is that hand motion capture methods may also be able to capture hand geometry, which may also be used as a factor to verify user identity.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

FIGS. 16A and 16B illustrate an in-air handwriting signal model and trajectory in three-dimensional space;

FIGS. 17A and 17B are graphical representations showing the effect of the "P" and "Q" terms of the loss function on the projected latent vector;

FIGS. 22A and 22B are graphical representations showing the distributions of Hamming distances between actual account hash codes and testing signal hash codes;

Corresponding reference characters indicate corresponding elements among the view of the drawings. The headings used in the figures do not limit the scope of the claims.

DETAILED DESCRIPTION

Figure 1:
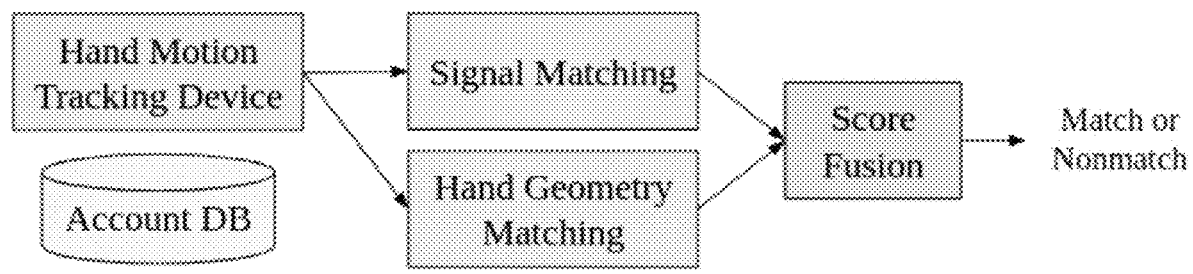
FIG. 1 is an illustration showing the present authentication framework.
Figure 2:
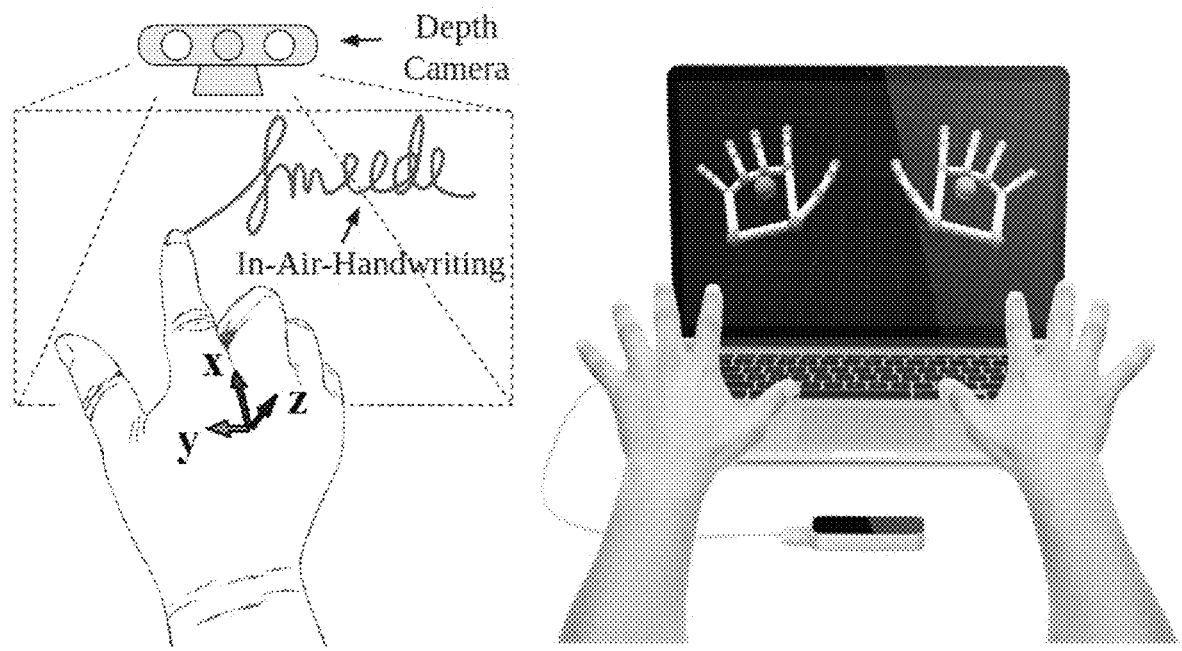
FIG. 2 is a an illustration showing the three-dimensional hand motion tracking as a user writes in the air (left) and hand geometry tracking (right)

Gesture biometrics are gaining popularity with gesture input interface on mobile and Virtual Reality (VR) platforms that lack a keyboard or touchscreen to type an ID and a password for user login. In the present disclosure, a login system that contains two modules is presented. The first module is a multifactor user authentication method using in-air-handwriting and hand geometry. The second module is a user identification method using deep neural network.

In the present disclosure, a multifactor authentication framework which can identify and authenticate a user by observing the shape of the user's hand and asking the user to write an ID string and a pass-code in the air with the index finger is disclosed. The content of the ID string or pass-code can be a meaningful phrase, a piece of scribbling like a signature, or a doodle as long as it can be easily reproduced by the same user but difficult to mimic by attackers. This piece of in-air-handwriting, as well as the hand geometry, is captured by a depth camera and compared with a template created at registration. For user authentication, three modalities are fused; including a secret (i.e., the passcode), a behavior biometric (i.e., the handwriting convention), and a physiological trait (i.e., the hand geometry) in one unified framework, which provides better security than password based authentication systems. Unlike traditional biometrics such as the fingerprint, iris and face, the gesture passcode used in this framework is revocable.

User identification is essentially indexing and searching the gesture motion templates in a large database efficiently. In the present disclosure, a user identification system that can generate a compact binary hash code from a piece of in-air-handwriting of an ID string is disclosed, which allows fast search in a database of in-air-handwriting templates through a hash table.

To address these problems, the present system is disclosed herein to efficiently obtain a user's account ID from the hand motion of writing an ID string in the air. The present system uses a deep convolutional neural network to convert the in-air-handwriting signal to a compact binary code, and further enables indexing and searching the gesture patterns in the account database with a hash table.

User Authentication System Architecture

The present identification and authentication framework includes five components (FIG. 1): a hand motion tracking device (e.g., Leap Motion controller), an account database, two matching algorithms, and a decision maker which fuses the matching scores and decides whether the authentication request is a match or a non-match.

Hand Motion Tracking Device:

When a user writes in the air, a contactless device captures the motion signal which contains a series of physical states of the hand sampled at a certain rate, such as the position trajectory. In the present system, a Leap Motion controller is used, which is able to provide 3D coordinates of each joint of the hand in sub-millimeter precision at around 110 Hz. Yet, it was discovered that the accuracy of motion tracking signal is not very reliable, e.g., sometimes the motion tracker cannot see the index finger when the hand points in certain directions. It also often misrecognizes a right hand facing with its palm facing downward as a left hand with its palm facing upward. As a result, only the position of the center of the hand is considered. The motion signal is denoted as a matrix R, where each column represents one axis (i.e., x, y or z of position), and each element is an individual sample in an axis at a specific time (denoted as Rij). R is further preprocessed and aligned to a template signal T to obtain an l by d matrix S. d is the number of axes (usually more than 3, as speed and acceleration can be derived using x, y, z from the time-stamped position series), and l is the number of samples (usually from 100 to 500). Besides the motion signal, the device also records a vector h consisting of the length of each bone of the user's hand as well as hand width. Usually, R and h are sent to the authentication server as an authentication request. It should be noted that as long as the hand motion tracking device can provide position samples and geometry of the hand, the disclosed framework can be applied. The matching algorithm disclosed is not restricted to the Leap Motion controller.

Account Database:

Each account in the authentication server is represented by a quad-tuple vector of <ID, T, C, t>. The disclosed framework allows one user to possess multiple accounts (i.e., multiple distinct account IDs). Here, T is the signal template, C is the variance with the same dimension as T, and t is the hand geometry template. T, C and t are all derived from a few preprocessed and aligned example signals $\{S^1, S^2, \ldots, S^k\}$ and example hand geometry vectors $\{h^1, h^2, \ldots, h^k\}$ at registration as follows:

$$t = \text{mean}(h^1, h^2, \ldots, h^k),$$

$$T_{ij} = \text{mean}(S_{ij}^1, S_{ij}^2, \ldots, S_{ij}^k),$$

$$C_{ij} = \text{var}(S_{ij}^1, S_{ij}^2, \ldots, S_{ij}^k).$$

Templates can be updated explicitly by the user or implicitly on a successful authentication attempt S and h to adapt minor changes of user behaviors in the following way:

$$t \to (1-\lambda)t + \lambda h,$$

$$T_{ij} \to (1-\lambda)T_{ij} + \lambda S_{ij},$$

$$C_{ij} + (1-\lambda)C_{ij} + \lambda(S_{ij} - T_{ij})^2.$$

Figure 3:
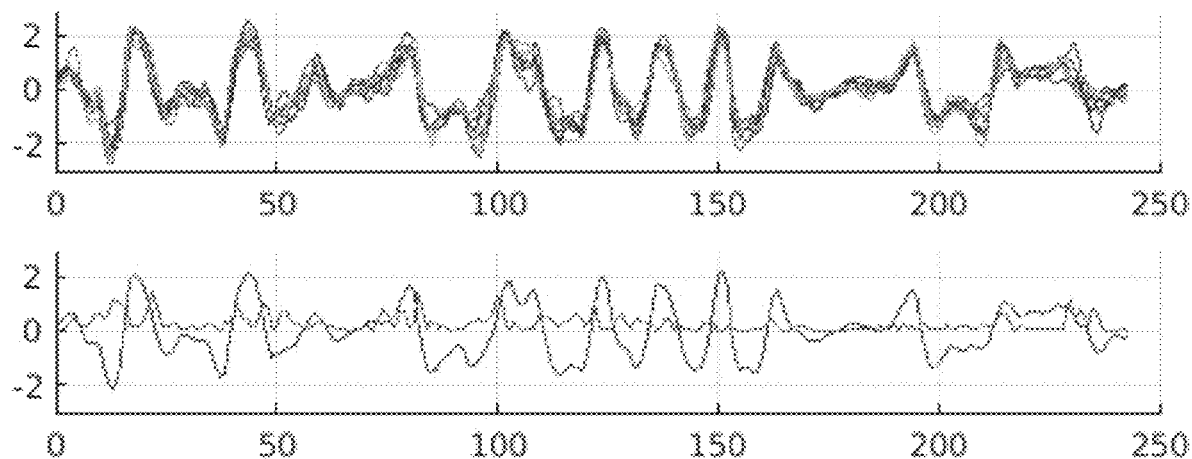
FIG. 3 is an example of aligned signals from the captured finger motion and the corresponding generated template.

Here, λ is the update rate that controls the influence of the newly accepted signal, determined empirically. C may be updated gradually to very large values if the behavior changes are large, which may need further regularization to keep the decision boundary in the same place. An example of aligned signals and the generated template is shown in FIG. 3.

Matching Algorithms and Score Fusion:

Once the authentication request is received, the server runs the following two matching algorithms in parallel: (1) signal matching, which matches the motion signal R with the stored signal template T with auxiliary information from the variance C, and (2) hand geometry matching, which matches the hand geometry h with the stored hand geometry template t of the account owner. After the results of the two matching algorithms are obtained, the authentication server fuses the results and makes the final decision.

Datasets:

The following three datasets were collected for evaluation:

100 users were asked to create 200 accounts, where each user created exactly two accounts. For each account, the user wrote a passcode in the air five times as the registration and five more times as authentication requests. Among the 100 users, 50 are male, the other 50 are female, and their age spans from 15 to 62. They have various educational backgrounds from middle school students to university professors, and diverse occupations including both office workers and non-office workers. Each user created his or her personal passcode without any constraints on the content or the length, but none of the 200 passcodes were identical. Seven impostors were asked to write each passcode in the first dataset five times as spoofing attacks. The impostors were informed with the content of the passcode.

Additionally, 22 users participating in the first dataset were asked to write the passcodes of the corresponding 44 accounts five times every three or four days, which was denoted as one session. In total there were 10 sessions, lasting for four weeks. This dataset was used in the study of long term stability of these algorithms.

Given an account with template signal T, each testing signal S obtained from the first dataset can be associated with a class label c as "true-user" or "false-user". If S and T are from the same user writing the correct passcode, c=true-user; otherwise c=false-user. Especially, if S is from the spoofing attack in the second dataset, c=spoof. "false-user" and "spoof" are collectively called "not-true-user". Without special notification, five signals are used to construct the template.

Matching Algorithm Details

Signal Matching:

The signal matching algorithm defines a distance between the signal in the authentication request and the stored template. It contains four stages: (1) signal preprocessing, (2) signal alignment, (3) element-wise distance scaling, and (4) threshold-then-vote (TTV). The TTV procedure represents the major difference between the disclosed algorithm and traditional DTW algorithm, and hence, the disclosed signal matching algorithm is called the TTV algorithm.

Signal Preprocessing:

To improve signal quality and facilitate matching in later stages, the raw signal obtained from the hand motion capture device goes through the following preprocessing steps:

(1) Fix missing data samples due to the limited capability of the motion capture device by linear interpolation.

(2) Derive velocity and acceleration for each sample from the time-stamped trajectory.

(3) Remove any high frequency components above 10 Hz (low-pass filtering).

(4) Throw away the samples at the start and the end of the signal when the hand stays still.

(5) Translate the coordinate system, i.e., make the average pointing direction of the hand as the x-axis.

(6) Down-sample the signal to 50 Hz.

(7) Normalize each column to zero mean and unit variance.

Figure 4:
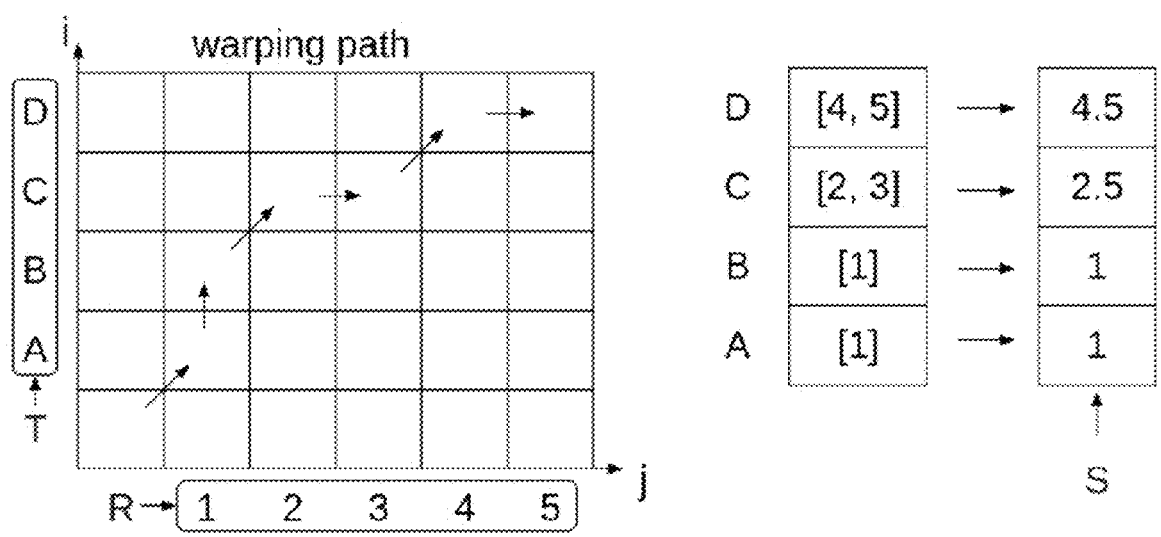
FIG. 4 is a graphical representation showing signal alignment through a warping path.

Signal Alignment:

To accommodate small differences in writing speed, the raw signal R is aligned to the template signal T before matching. First, dynamic time warping is ran on R and T to obtain a warping path, with a window constraint of ±50 samples (i.e., ±1 second). Then each sample $S_{ij}$ of the aligned signal S is calculated by taking the average of a range of samples in the original signal mapped to $T_{ij}$ on the warping path. Unlike most related works, which use DTW to directly calculate distance of two signals, DTW is only employed in the present disclosure for temporal alignment. An example of signal alignment given the warping path is shown in FIG. 4. Here, the signal (1, 2, 3, 4, and 5) is aligned to the template (A, B, C, and D). Given the warping path, A is mapped to 1, B is mapped to 1, C is mapped to 2.5 (i.e., average of 2 and 3), D is mapped to 4.5 (i.e., average of 4 and 5).

Element-Wise Distance Scaling:

After the alignment, element-wise distance D is calculated, $$D_{ij}=|S_{ij}-T_{ij}|$$

and two element-wise scalars P and Q are computed, $$P_{ij}=1/(1+p\times T_{ij}),$$

$$Q_{ij}=1/(1+q\times C_{ij}).$$

Then D is scaled element-wise by P and Q. The logic is that less importance (i.e., more tolerance) should be applied if the template has a larger value (i.e., higher intensity) or a larger variance (i.e., higher uncertainty). This phenomenon is discovered on signals of inertial sensor but it is also applicable to the disclosed framework. p and q are both tweak-able parameters (in the present system p=1, q=0.5) determined by empirical results.

Threshold-Then-Vote (TTV):

Once the scaled element-wise distance is obtained, the beginning 5% and ending 10% of the signal as well as the corresponding parts of the template are trimmed down. Then, the final signal level distance is calculated as follows:

$$dist(S, T) = \frac{1}{l\times d}\sum_{i}^{l}\sum_{j}^{d} TTV(D_{ij}\times P_{ij}\times Q_{ij}).$$

Here l is the trimmed template length, and d is the number of sensor axes. TTV(x) is a step function determining whether a single sample point is matched or not, defined as follows:

$$TTV(x) = \begin{cases} 0, & \text{if } x \leq th_1 \\ 0.5, & \text{if } th_1 < x \leq th_2 \\ 1, & \text{if } x > th_2 \end{cases} \quad (1)$$

This stage maps element-wise distance to "match" (i.e., 0), "non-match" (i.e., 1), or "unsure" (i.e., 0.5), then treats each element-wise distance as a "vote". The insight is to prevent large scarce element-wise distance (i.e., local non-matches) from propagating to the final signal level distance. On the one hand, such local non-matches appear quite often when the signal and the template are obtained from the same user writing the same passcode, which should be tolerated during the decision making stage. On the other hand, signals and templates obtained from different users or from writing different passcodes are different everywhere, and the voting result is likely to be dominated by non-matches even with the tolerance of a few local non-matches.

Figure 5:
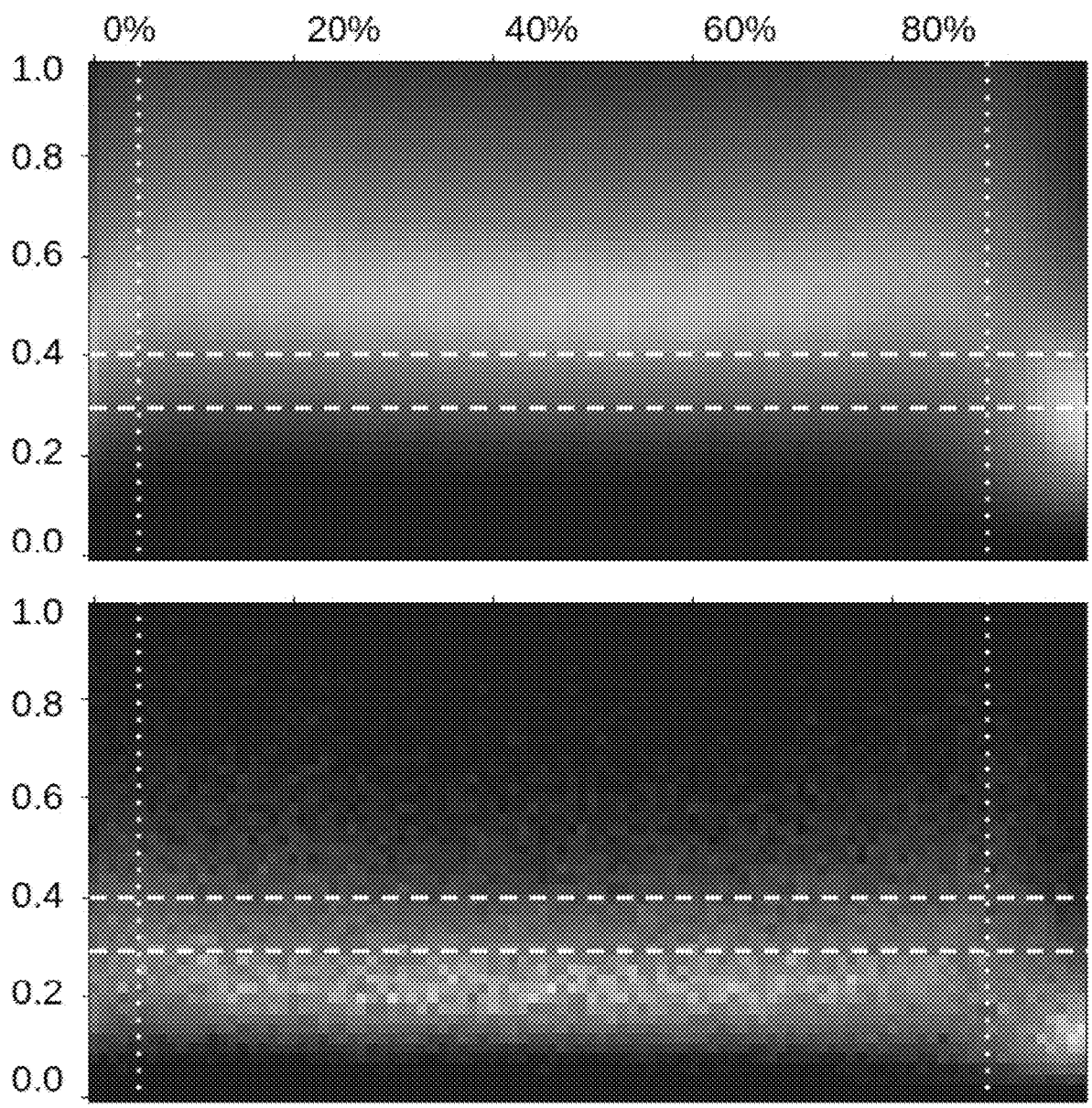
FIG. 5 is a graphical representation showing the distribution of the scaled element-wise distance between a signal and its template.

Analysis:

First, the distribution of the scaled element-wise distance is shown in respect to the rows averaged over all sensor axes and over all accounts, i.e., an approximation of the class-conditional probability $$p\left(\frac{1}{d}\sum_{j}^{d} D_{ij} \middle| c\right),$$

shown in FIG. 5. It can be observed that local differences between the signal and the template are generally evenly spread along the rows given a large amount of accounts, while the beginning 5% and the ending 10% have anomalies. This is mainly caused by the nature of the alignment algorithm which forces the beginning and the end to be mapped together. For signals and templates generated by the same user, the element-wise distance is smaller than those generated by different users or by writing different passcodes. Still, their distributions overlap between 0.3 and 0.4 (shown as the dashed horizontal lines, which determine the $th_1$ and $th_2$ parameters in the TTV algorithm). It can also be observed that for the occasional instances of $D_{ij}$ being greater than 0.4 in the true-user class. These distances are tolerated due to their limited amount of non-match votes, but for those in the false-user class, such large distances dominate the votes.

Figure 6:
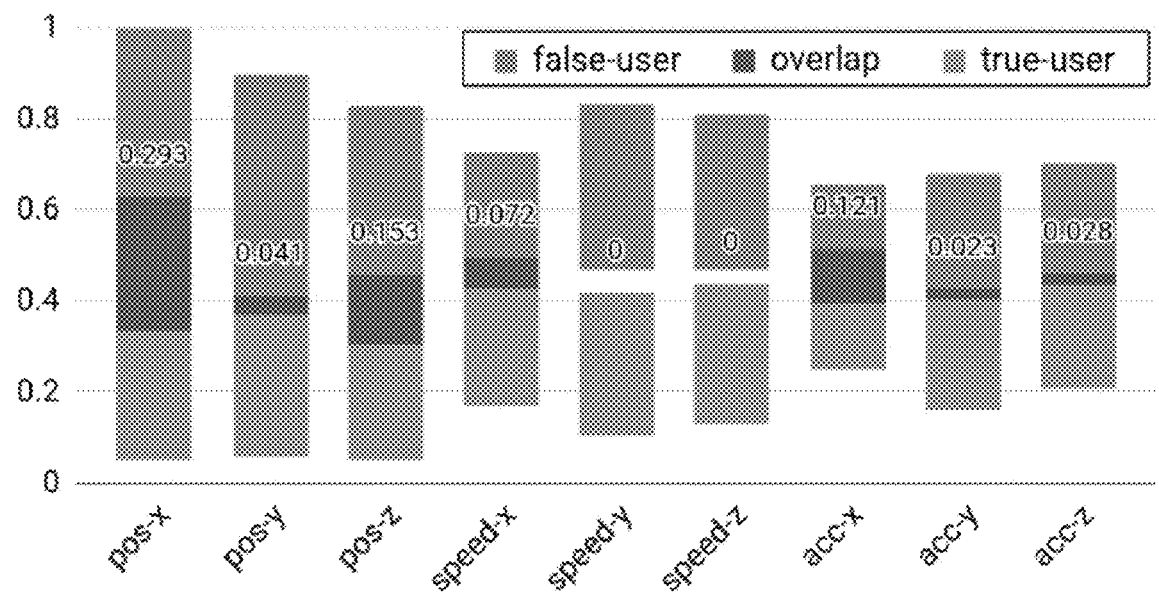
FIG. 6 is a graphical representation showing the distribution of the distances between a signal and its template with respect to the quality of the signal on each axis.

Second, the distribution of the element-wise distance $D_{ij}$ in respect to the columns averaged over all rows and over all accounts is shown, i.e., an approximation of the class-conditional probability $$p\left(\frac{1}{l}\sum_{i}^{l} D_{ij} \middle| c\right),$$

shown in FIG. 6. FIG. 6 shows that the quality of the signal in each sensor axis, i.e., larger overlap indicates more difficulty in distinguishing the two classes based on that column. In general, the element-wise distances in the x direction vary greater than other directions even for the same user writing the same passcode. This is reasonable as the way a person writes in the air resembles writing on an invisible surface, and in this case the x axis is defined as the average pointing direction of the index finger. Also the element-wise distances in position columns are more widely spread, implying that human users are better at maintaining the same speed and force (which is equivalent to acceleration) than maintaining the same trajectory.

Figure 7:
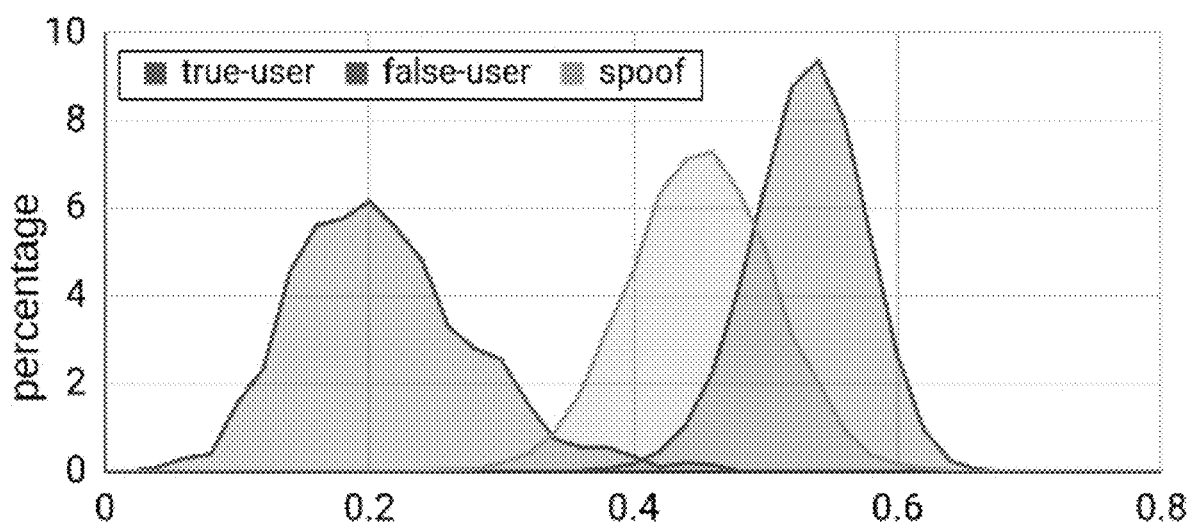
FIG. 7 is a normalized histogram showing the signal level distances over all accounts.

Third, the normalized histogram of the signal level distances dist(S, T) is shown over all accounts in FIG. 7, i.e., an approximation of the class-conditional probability p(dist (S, T)|c). The overlap between the histograms of different classes denotes the discriminating capability of the signal matching algorithm as a whole according to the Bayes Decision Theory. The disclosed framework of the present system achieves 1.2% overlap between the true-user class and the false-user class, as well as 5.8% overlap between the true-user class and the spoof class. This also shows that different people write the same content in significantly different ways.

Figure 8:
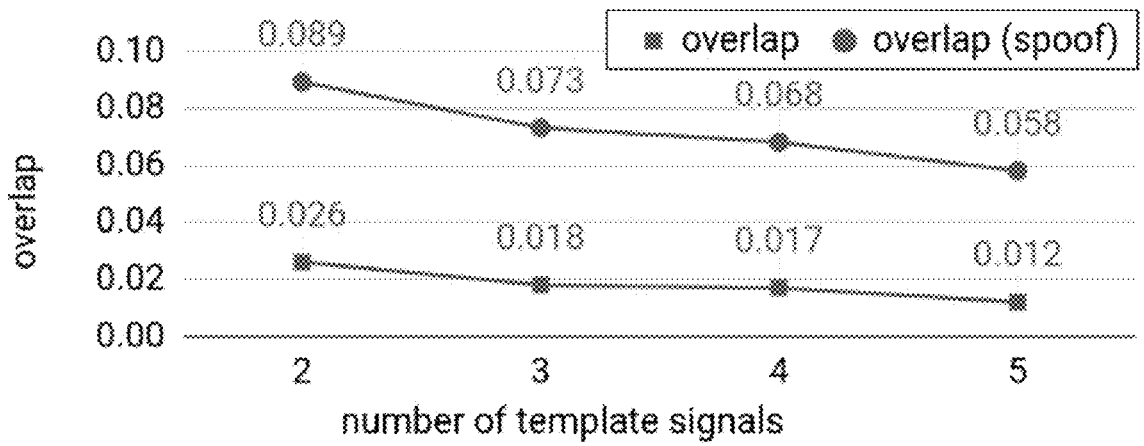
FIG. 8 shows the influence of the number of signals used to build each template.

Fourth, the influence of the number of signals used to build the template is shown in FIG. 8. Clearly more signals at registration help to construct a better template, but the benefit is marginal. The disclosed framework can achieve acceptable results even with only two signals for template construction.

Figure 9:
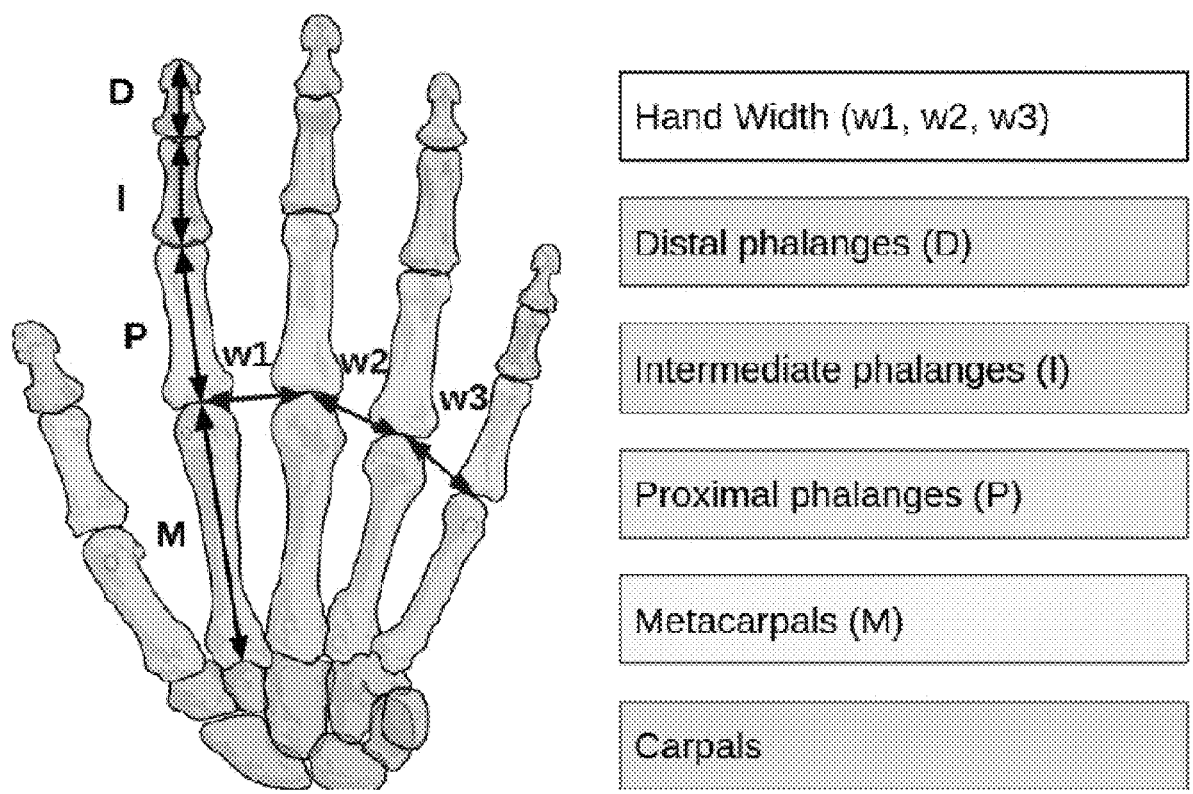
FIG. 9 is an illustration showing that the lengths of the bones in a user's hand, as well as the widths between each bone, are used to determine hand geometry of the user.

Hand Geometry Matching:

In the disclosed framework, hand geometry is defined as the length of each bone of the hand (excluding the wrist) as well as the width of the hand collectively, shown in FIG. 9. The bone length features contain 19 components, which are the lengths of metacarpals, proximal phalanges, intermediate phalanges, and distal phalanges of the five fingers on a hand (note that the thumb does not have intermediate phalanges). The hand width features include 3 components, which are the distances between the far ends of metacarpals of two adjacent fingers except the thumb (shown in FIG. 9 as w1, w2, and w3). Collectively, the hand geometry vector h is constructed by these 22 components, as is the hand geometry template t.

Figure 10:
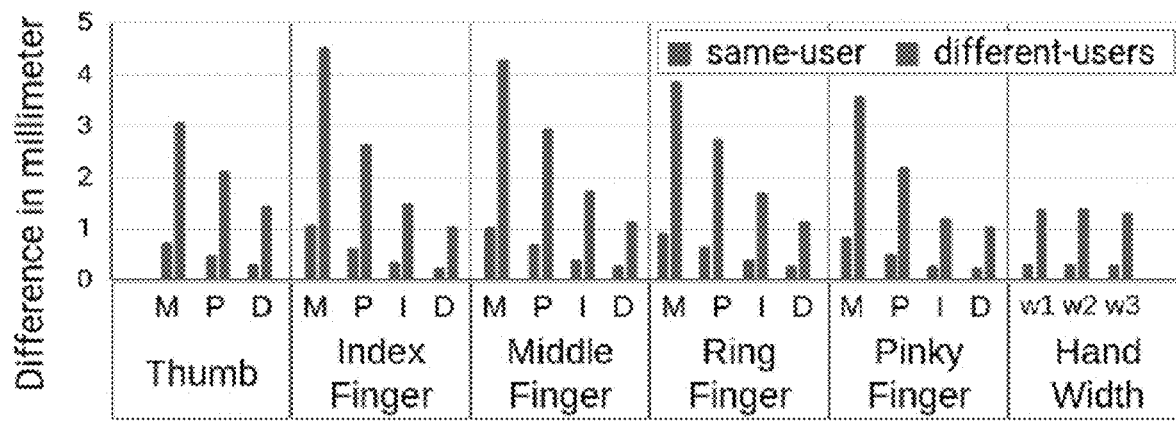
FIG. 10 shows the differences between each individual hand geometry component of the same user, as well as different users.

If the authentication requester is the account owner, they must have the same hand for writing, and hence, the hand geometry in the request should not differ from the stored hand geometry template significantly. The differences between each individual hand geometry component of the same user as well as different users were measured, shown in FIG. 10. Obviously, the average length differences of different hands are greater than the same hand. However, it is highly possible that two different hands have similar shapes and there is no way to determine whether they are from the same user merely based on the geometry. Also, the hand motion tracking device needs to obtain the hand geometry measurement from the user's hand image in sub-millimeter precision, which is challenging. Thus, each measurement of the same hand will vary slightly, even the sensor itself reports 100% confidence. Another important fact is that all these 22 components have strong correlations, because the five fingers on the same hand grow together. Based on these factors, the hand geometry difference function is defined as follows:

$$dist(h, t) = \frac{1}{22} \sum_{i} \frac{h_i - t_i}{t_i}$$

Figure 11:
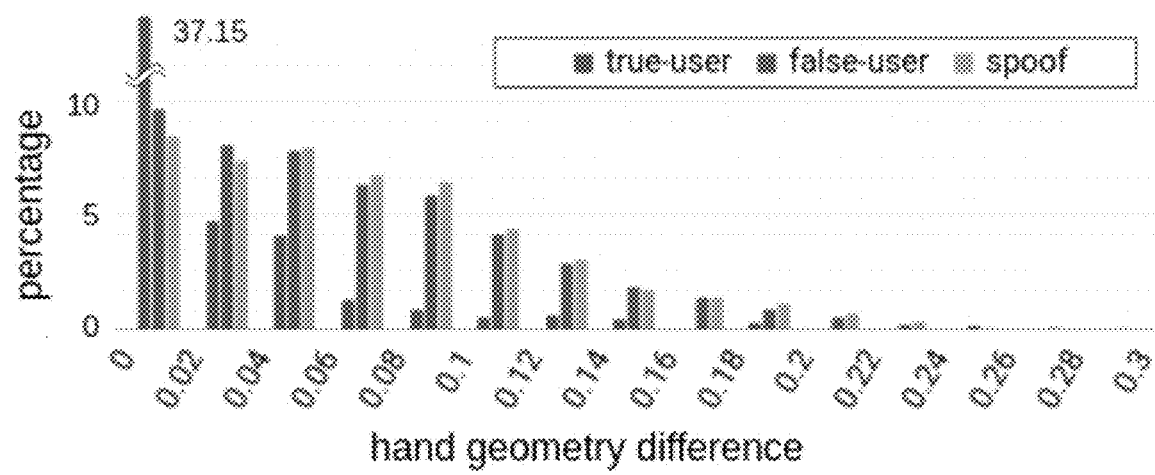
FIG. 11 is a graphical representation of the distribution of the differences between hand geometry of the same user and the hand geometries of spoof users.

The distribution of dist(h, t) is shown in FIG. 11. In general, hand geometry is considered a weak feature in the decision-making procedure.

Score Fusion:

The final score of an authentication request is calculated by fusing the information from the signal matching and the hand geometry matching as follows:

score=dist($S,T$)+$w_1$dist($h,t$)+$w_2$|$l_T$-$l_R$|/$l_T$

Essentially, the final score is a weighted sum of signal level distance, hand geometry difference, and signal length difference, which is the third term |$l_T$-$l_R$|/|$l_T$, where $l_T$ is the length of the template, and $l_R$ is the length of the signal in the authentication request before alignment. Here the two weights $w_1$ and $w_2$ are determined empirically (in the present system, $w_1$=0.4 and $w_{2=0.05}$). Since hand geometry difference and signal length difference are all weak features, their weights are smaller than 1 and largely depend on the correlation to the signal level distance.

Finally, the disclosed algorithm uses the signal level distance to make the decision, i.e., if the score is below the decision threshold, the request is accepted and hence the user passes authentication; otherwise, the request is rejected and the user fails authentication. The decision threshold is set as a tradeoff between accuracy and convenience. If the decision threshold is small (i.e., strict), legitimate users may be rejected unexpectedly, while if the decision threshold is large (i.e., loose), attackers may be accidentally accepted.

Experimental Evaluation of the Authentication System

Figure 12:
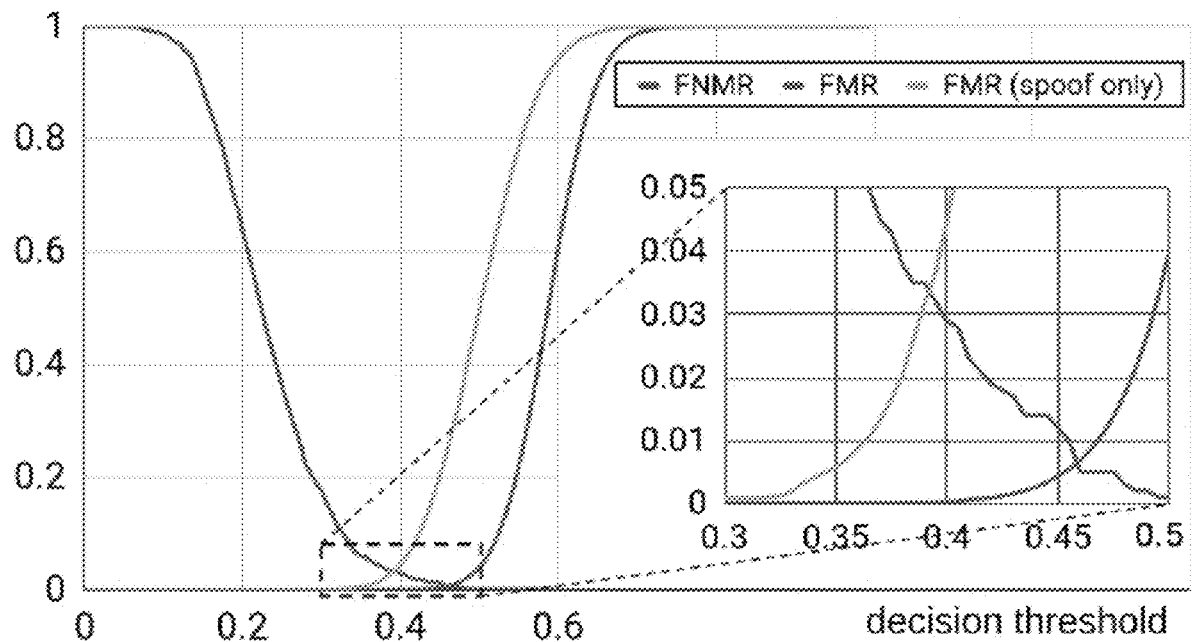
FIG. 12 is a graphical representation of the distribution of false non match rates and false match rates, varying with the set decision thresholds.
Figure 13:
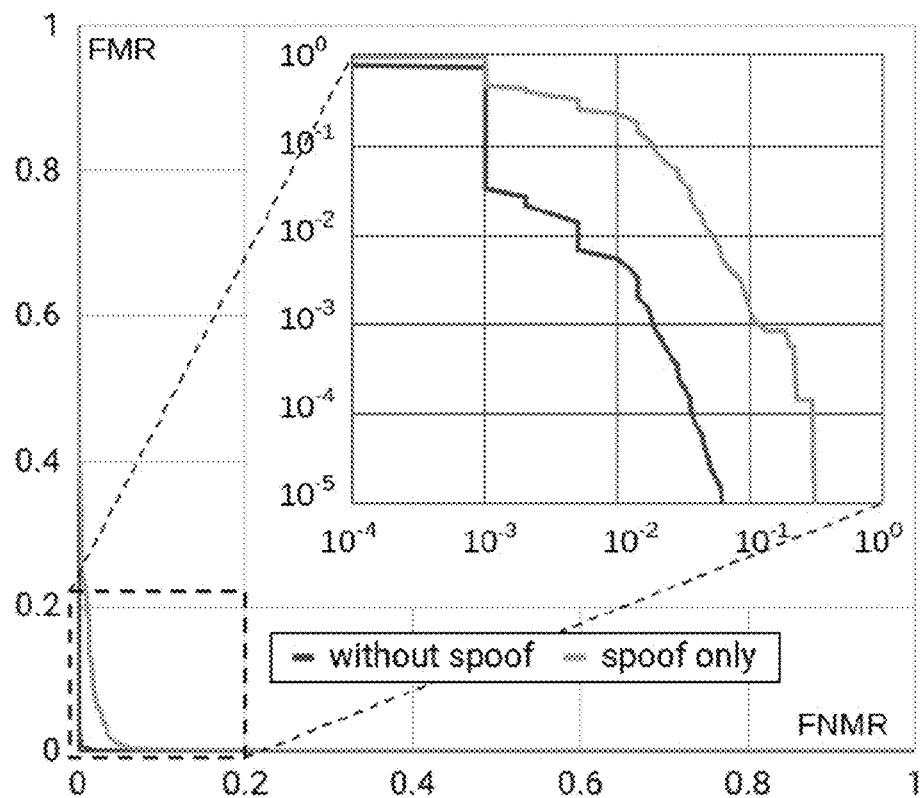
FIG. 13 is a graphical representation that illustrates the Receiver Opening Characteristic (ROC) curve.

Using the fused score described above, experiments were ran on the first and second datasets while varying the decision threshold. Here, EER is defined as the rate when False Non-Match Rate (FNMR) is equal to the False Match Rate (FMR) (also shown in FIG. 12). FMR 10K, FMR 100K, and Zero-FMR are the corresponding FNMRs when FMR is $10^{-4}$, $10^{-5}$, and zero respectively, also shown in the Receiver Operating Characteristic (ROC) curve in FIG. 13

Figure 14:
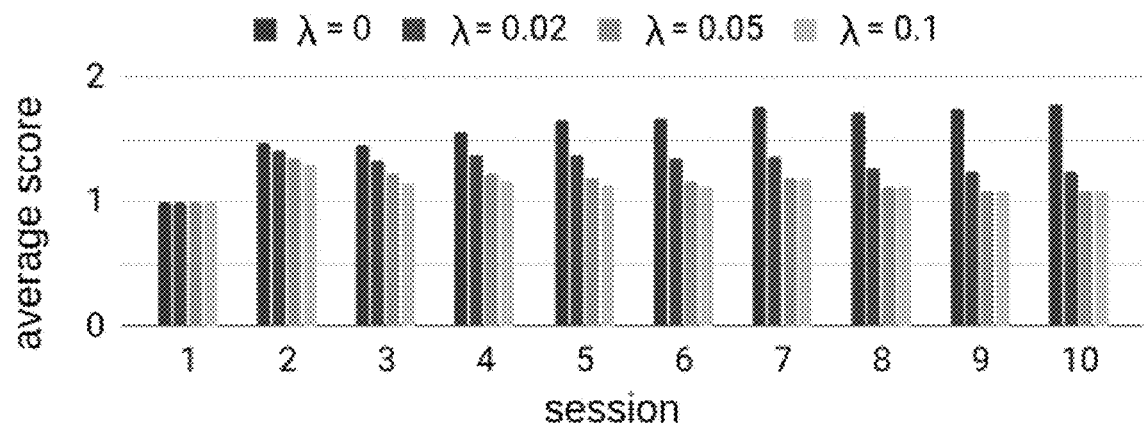
FIG. 14 is a graphical representation depicting changes of the fused score over the course of ten sessions.

Experiments were also ran on the third dataset and the changes of the fused score over the 10 sessions are shown in FIG. 14. Without a template update, the score of the true-user class had increased to around 1.75 times relative to the first session. However, with a template update of 0.1, the score increase converged to about 1.09 times relative to the first session. This effect is mainly caused by the limited number of sample signals for template construction. A deeper reason may be the inherent complexity of in-air-handwriting, especially considering the writing behavior variation, which is difficult to represent merely with a template built from several example signals. The long-term stability of the authentication performance differs by account, e.g., for most accounts, the score at the first session is far away from the decision threshold and the score increase with time will not generate false non-matches.

The performance improvement of the disclosed framework comes from several aspects. First, the preprocessing steps retain valuable information for authentication and make the matching algorithm robust against poor signal quality and small variation in users' postures. Second, the threshold-then-vote procedure prevents the discriminating capability degradation caused by locally mismatched signal segments, which can be justified by the performance of the TTV algorithm. Third, fusing hand geometry and length difference with the signal level distance further removes many false matches.

User Identification System Architecture

Figure 15:
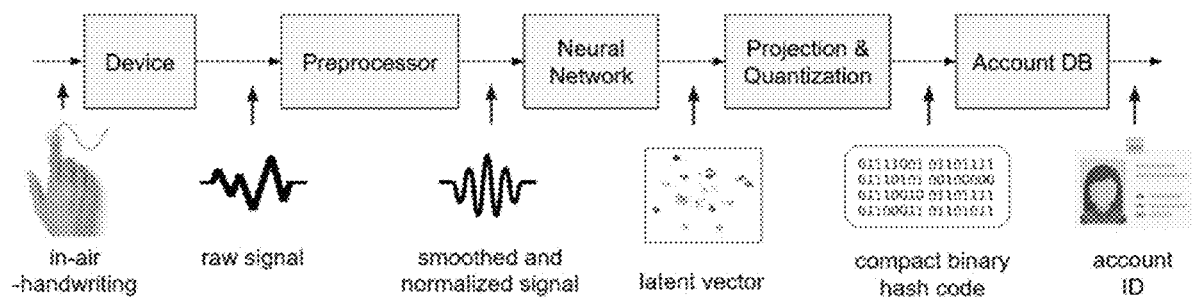
FIG. 15 is an illustration showing the system architecture and procedures for the present system.

The present user identification system (shown in FIG. 15) includes five components: (1) An in-air-handwriting motion capture device (e.g., a Leap Motion controller in the present implementation); (2) A preprocessing module smoothing and normalizing the captured motion signal; (3) A deep Convolutional Neural Network (CNN) that takes preprocessed motion signal x as input and generate a high dimensional floating point latent vector h (denoted as a function $f(x)=h$); (4) An additional neural network layer that project the latent vector h to low dimensional space and quantize the projected result to B-bit binary hash code $b \in \{-1,+1\}^n$ (denoted as another function $g(h)=b$, and B is usually 16, 32, 64, etc.); (5) An account database that stores a hash table index of account tuples <ID, $b^{ID}$, $h^{ID}$>, where ID is the account ID (usually a unique number generated by the system at registration), where $b^{ID}$ and $h^{ID}$ are the hash code and latent vector corresponding to the account; (6) An optional verification module that runs after an ID is obtained by framework. This ID is a candidate ID. The system can run a procedure similar to the authentication procedure by comparing the in-air-handwriting of the ID string to some information stored in the account referred by the candidate ID, which can further eliminate wrong identification results.

Signal Acquisition and Preprocessing

The in-air-handwriting of an ID string is captured by the Leap Motion controller in the present implementation as a raw signal containing the 3D position coordinates of the center of the palm, sampled at about 110 Hz. Once this raw signal is obtained, the 3D velocity, and 3D acceleration are further obtained by calculating the vector difference of adjacent position samples. Then, the signal is normalized in pointing direction (making the average hand pointing direction as x-axis) and amplitude (mean subtraction and division by standard deviation). Finally, it is resampled to a fixed length of 256 data points in each dimension to form the 256×9 input vector x. Examples of the motion signal and the trajectory of in-air-handwriting are shown in FIGS. 16A and 16B.

Hash Code Generation Method Details

The deep neural network and the additional projection-quantization layer are implemented together and collectively referred to herein as a "framework". Multiple design goals are desired with the present framework. First, for a pair of in-air-handwriting signals $(x_1,x_2)$, if they are generated by the same user writing the same ID string, the corresponding hash codes $(b_1,b_2)$ should be the same in most cases (or differ only in one or two bits sometimes, due to the fuzziness of the signals); if they are generated from different ID strings (regardless of if the same user or different users are considered), $(b_1,b_2)$ should differ by at least three bits. Second, the neural network should learn contrastive representations h to facilitate the projection. Third, the neural network should be easy to train and fast to converge.

TABLE 1

| Framework Architecture | | | |
|---|---|---|---|
| layer | kernel | output | #para |
| | Input: 256 * 9 | | |
| conv-pool1 | 3→1 conv, 2→1 max pool | 128 * 48 | 1.3k |
| conv-pool2 | 3→1 conv, 2→1 max pool | 64 * 96 | 14k |
| conv-pool3 | 3→1 conv, 2→1 max pool | 32 * 128 | 37k |
| conv-pool4 | 3→1 conv, 2→1 avg pool | 16 * 192 | 74k |
| conv-pool5 | 3→1 conv, 2→1 avg pool | 8 * 256 | 147k |
| fc (latent) | fully connected | 512 | 1,048k |

| layer | output | #para |
|---|---|---|
| cross-entropy loss | | |
| softmax | 200 | 102k |
| pairwise loss | | |
| projection | B | 512*B |

To achieve these goals, the framework has been designed in the following way, as shown in Table 1. First, 5 convolutional and max-pooling layers are applied with simple VGG-like kernel and a fully connected layer to map input signal x to latent vectors h. Both the convolutional layer and the fully connected layer have leaky ReLU activation. Next, the projection layer projects the latent vector h to a space with the same dimension as the final hash code, i.e., z=Wh+c, where z is the projected vector whose size is B. After that, the hash code is generated by taking the sign of the projected vector $b_i=\text{sign}(z_i)$, $1 \leq i \leq B$. This is essentially partitioning the latent space by B hyperplanes to obtain at most $2^B$ regions associated with different hash code. Additionally, a softmax layer is added in parallel with the projection layer to help train the neural network.

Training the framework is equivalent to placing all registered accounts into these $2^B$ regions, which is achieved progressively in two main steps. First, the network is trained with the softmax layer and cross-entropy loss to make the filter layers converge. In this step, the projection layer is not activated. Note that the softmax classification layers does not need to contain all accounts if the account number is large, or even an independent dataset for pre-training can be utilized.

Second, the network is trained using the projection layer with the following pairwise loss L, and mini-batches of 2M pairs of signals $(x_1^{(i)}, x_2^{(i)})$, $1 \le i \le 2$ M. Half of the mini-batch are pairs of signals from the same class ($y^{(i)}=0$), and half are pairs of signals from different classes ($y^{(i)}=1$).

$$L = \frac{1}{2M} \sum_{i=1}^{2M} L^{(i)},$$

$$L^{(i)} = (1-y^{(i)})\|z_1^{(i)} - z_2^{(i)}\| + y^{(i)} \max(m - \|z_1^{(i)} - z_2^{(i)}\|, 0) + \alpha(P(z_1^{(i)}) + P(z_2^{(i)})) + \beta(Q(z_1^{(i)}) + Q(z_2^{(i)})).$$

Here $\|\cdot\|$ is Euclidean norm. In this loss function, the first term forces the projected vectors of the same classes to the same value, and the second term forces the projected vectors of different classes to separate at least m in Euclidean distance. The remaining terms P(z) and Q(z) are the so-called "pq-regularizer" which is specially designed to help place all registered accounts into different regions and avoid ambiguity in quantization. These two terms are defined as follows:

$$P(z^{(i)}) = \sum_{j=1}^{B} \max(|z_j^{(i)}| - p, 0),$$

$$Q(z^{(i)}) = \sum_{j=1}^{B} \max(q - |z_j^{(i)}|, 0),$$

where p and q are hyperparameters, |zj(i)| is taking absolute value of the jth component of $z^{(i)}$. This regularizer forces each element of the projected vector z to reside in the region [−p, −q] or the region [+q, +p], which corresponds to the bit −1 and bit +1 in the hash code $b_i$ after quantization. With a careful choice of m, a pair $(z_1, z_2)$ of different accounts can be pushed to opposite regions, and hence, hashed to different binary codes, as shown in FIGS. 17A and 17B. One example choice of m through experimentation is $p\sqrt{B}$, which is the Euclidean distance from the origin to the point z*=(p, p, . . . , p). This forces the hash code of signals of different accounts differ at least one bit. Experience shows that larger m helps separation, but hurts convergence. The hyperparameter α,β controls the portion of contribution of the regularizer in the total loss and gradients. This design philosophy of the deep hashing network differs from most related works that try to minimize quantization loss (i.e., forces the projected vector to be close to the nodes of Hamming hypercube). Instead, the input is mapped to a bounded Euclidean space and pushed away from the decision boundary $z_j=0$, where a relatively large region can be quantized to the same bit value regardless of the quantization error. The effectiveness of the disclosed regularizer relies on the assumption that ID strings are distinctive, which is true in an identification system, but not in an image retrieval system. Meanwhile, both the activation function and the regularizer are piece-wise linear, which is easier to compute and train compared to the saturation methods such as tanh or sigmoid relaxation commonly used in deep hashing.

Account Database and Procedures

As mentioned previously, each account contains a tuple of <ID, $b^{(ID)}$, $h^{(ID)}$>. At registration time, the system generates a unique ID number for the registered account. The user is asked to create an ID string and write it K times. The obtained K in-air-handwriting signals $\{x^{(1)}, x^{(2)}, \ldots, x^{(K)}\}$ are utilized to train the framework. Once the training is finished, the training signals can be used to construct $b^{ID}$ and $h^{ID}$ as follows:

$$h^{ID} = \sum_{i=1}^{K} h^{(i)} = \sum_{i=1}^{K} f(x^{(i)}),$$

$$b^{ID} = g(h^{ID}) = \text{sign}(W h^{ID} + c),$$

where $f( )$ is the deep neural network, $g( )$ is the projection and quantization process, and sign( ) is an element-wise sign function. A hash table is also constructed to index all account tuples using the hash codes $b^{ID}$.

At identification time, given a preprocessed in-air-handwriting signal x', the following steps are proceeded to obtain the account ID. First, the forward path of the framework is ran to obtain a latent vector h' and b'. Second, the hash table is searched using b' with a fuzziness tolerance of l bits. If l is 0, the hash table will simply be searched using b'. If l is not 0, the hash table is searched multiple times with each element of a collection of hash code S, where S contains all possible hash codes with a Hamming distance less than or equal to l bits from b'. The rationale is that the fuzziness in the writing behavior will eventually lead to errors that make b' differ from the hash code of its real account, but this difference should be smaller than l bits. In practice, l is usually set to 1 or 2 in order to limit the total number of searches for a prompt response. In this way, a collection of candidate accounts will be obtained. The third step is to compare h' with the latent vector of every candidate account to find the nearest neighbor. Finally, the account ID of this nearest neighbor is returned as the identified ID.

ID Verification

In this identification procedure described previously, the final nearest neighbor search step serves as a verification of the ID. Alternatively, the system may store a template of the handwriting of the ID string generated at registration for each account, instead of the $h^{ID}$. Upon an identification request, the system can compare the signal in the request with the templates of all candidate accounts obtained by the hash table search and run a procedure similar to an authentication system to verify the candidate IDs. The motivation is that the hashing step loses information in the in-air-handwriting, which may lead to collisions if an imposter writes the same ID string as a legitimate user, and hence, a verification step can reduce misidentification significantly. Since the verification step is essentially an authentication system, it will not be elaborated on in the present disclosure. Besides, an attacker can create colliding signals if both the hash code $b^{ID}$ and the parameters of the neural network are leaked because FMHashNet generates fuzzy hash codes instead of crypotographic hash codes.

In practice, $b^{ID}$ can be hashed again using a cryptographic hash algorithm such as SHA-256 for the hash table, while searching with bit tolerance can still work (S contains cryptographically hashed elements of the original S). In this case, the cryptographic hash of $b^{ID}$ is stored in the account database. Moreover, this cryptographic hash can be further used to generate a key to encrypt the template for the ID verification to further improve the security.

Experimental Evaluation of the Identification System

Dataset:

A dataset was collected of 200 accounts with 200 distinct in-air-handwriting ID strings, created by 100 users with exactly two accounts per user. For each account, the user wrote an ID string five times as registration and then five times as five independent identification tests. Roughly half of the users were college students (including both undergraduate and graduate students), and the other half were people of other various occupations (including both office workers and non-office workers). The contents of the ID strings were determined by the users and no two ID strings were identical. Most users chose a meaningful phrase for ease of memory and wrote the ID strings very quickly and illegibly for convenience. The amount of time to write an ID string in the air was usually between 3 to 8 seconds, depending on the complexity of the ID string that was chosen.

Implementation Detail:

The present framework may be implemented in TensorFlow on an Nvidia GTX 1080 Ti GPU. The weight parameters are initialized with the Xavier method and the Adam optimizer with an initial learning rate of 0.001 is used. The leaky ReLU negative slope is set to 0.2. The regularizer hyperparameter p is set to 10, q is set to 5. Based on experience, reasonably good results can be achieved with a wide range of different p and q values as long as p−q is larger than one. The inter-class distance m is set to $p\sqrt{B}$, the hash code size B is 16, 32, 48 or 64. For the training protocol, the softmax layer and cross-entropy loss are first used with 1,000 iterations. Then, the projection layer and pairwise loss are used with pq-regularizer for another 10,000 iterations. During these 10,000 iterations, α is set to 0.1 and β is initially set to 0.0001 for the first 4,000 iterations, then gradually increased 10 times every 2,000 iterations until it reaches 0.1. The training pairs are selected online, and MA is set to 200 in a mini-batch. For the pairs of the same account, an account and two training signals of that account are randomly selected; for the pairs of different accounts, the account hash code $b^{ID}$ is calculated every 20 iterations for each account, and pairs are selected from those accounts whose hash codes differ less than three bits. If no such account exists, a pair of two signals from two different accounts is chosen at random.

Another major challenge that was encountered was the limited amount of training data (only five signals per account). To overcome this challenge, the training dataset was augmented into two steps. First, given K signals {$x^{(1)}$, $x^{(2)}$, ..., $x^{(K)}$} obtained at registration, for each $x^{(k)}$ in this set, all the other signals are aligned to $x^{(k)}$ to create K−1 additional signals using Dynamic Time Warping, and in total $K^2$ signals can be obtained (in experimental data, 25 signals were obtained). Second, two aligned signals are randomly picked and a random segment is exchanged to create a new signal. This step is repeated many times. This results with each account being assigned 125 training signals.

TABLE 2

| | Performance Comparison (with hash code side B = 16) | | | | | | | | | | | |
|---|---|---|---|---|---|---|---|---|---|---|---|---|
| | average precision | | | average recall | | | miss-rate | | | fail-rate | | | training |
| methods | 0 bit | 1 bit | 2 bit | 0 bit | 1 bit | 2 bit | 0 bit | 1 bit | 2 bit | 0 bit | 1 bit | 2 bit | time |
| DSH-like [16] | 0.995 | 0.916 | 0.636 | 0.918 | 0.892 | 0.632 | 0.004 | 0.081 | 0.362 | 0.078 | 0.026 | 0.005 | 648 s |
| tanh | 0.970 | 0.821 | 0.494 | 0.443 | 0.638 | 0.474 | 0.014 | 0.139 | 0.484 | 0.544 | 0.223 | 0.042 | 637 s |
| Ours | 0.999 | 0.995 | 0.979 | 0.944 | 0.972 | 0.975 | 0.001 | 0.005 | 0.021 | 0.055 | 0.023 | 0.004 | 610 s |

Figure 18:
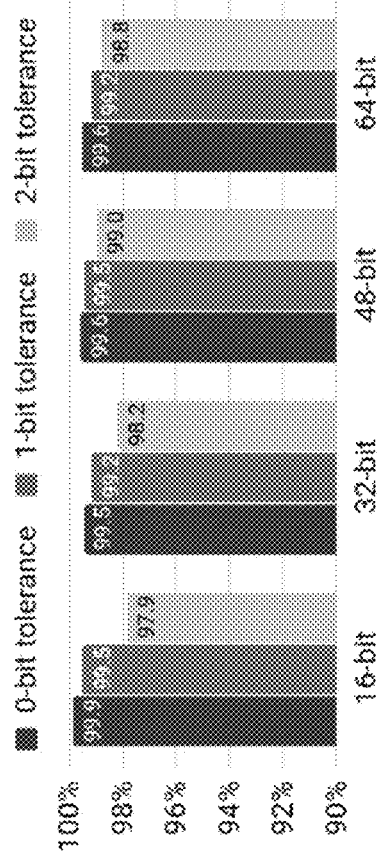
FIG. 18 is a graphical representation showing the average precision of account identification varying with hash code size and bit tolerance.
Figure 19:
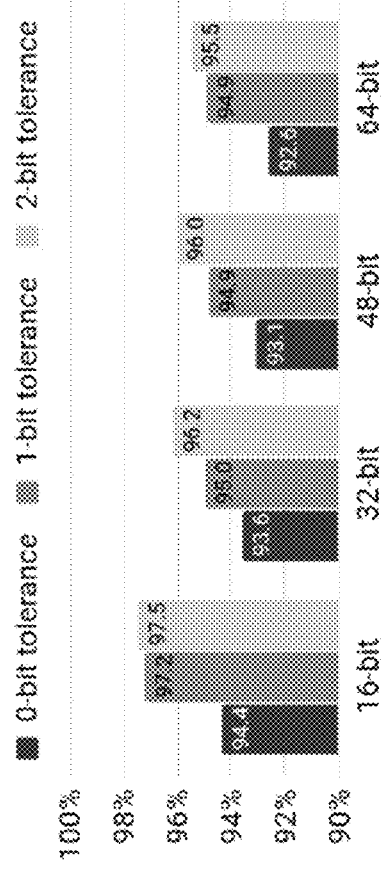
FIG. 19 is a graphical representation showing the average recall rate of all accounts varying with hash code size and bit tolerance.
Figure 20:
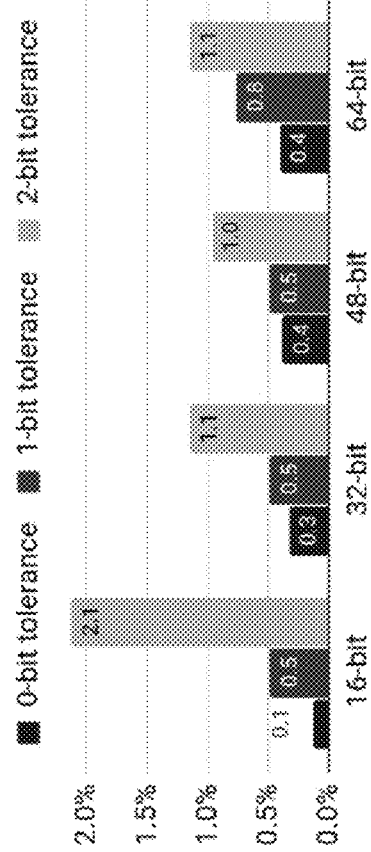
FIG. 20 is a graphical representation showing the misidentification rate of accounts varying with hash code size and bit tolerance.
Figure 21:
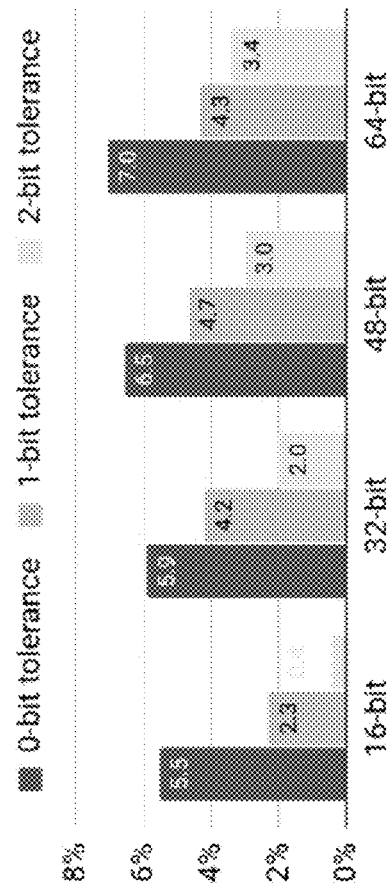
FIG. 21 is a graphical representation showing the identification failure rate of accounts varying with hash code size and bit tolerance.

Empirical Results:

The neural network was trained with varied hash code size B=16, 32, 48, 64 and fuzziness tolerance l=0, 1, 2. In a single experiment, the neural network was trained from scratch with the 200×125 augmented training signals and ran the identification procedure with the 200×5 testing signals from the 200 accounts. Given a testing signal x of an account A, if x is correctly identified as account A, it is a true positive of account A; if it is wrongly identified as some other account B, it is a false negative of account A and false positive of account B, also counted as a misidentification; if it is not identified as any account, it is counted as a failure of identification. The performance metrics were average precision of all accounts (FIG. 18), average recall of all accounts (FIG. 19), misidentification rate (total number of misidentification divided by 200'5, FIG. 20), and failure of identification rate (total number of failure of identification divided by 200'5, FIG. 21). Due to the stochastic nature of neural network, the results were obtained by averaging the performance of five repetitions of the same experiment with the same parameter settings. The ID verification step was not included in this evaluation. These results show that the disclosed framework performs consistently in the user identification task on the present dataset with variable hash code size. In general, larger hash code sizes provide better security since it is more difficult to guess the hash code without knowing the writing content, but it is also more difficult to train due to the added parameters. Also, a larger fuzziness tolerance l leads to less failure of identification (i.e., improved recall) but more misidentification. In practical identification system, it is recommend to set l=0 without ID verification for simplicity or set l=2 with ID verification for better security.

Next the amount of fuzziness in the hash code as a result of the inherent variation in the in-air-handwriting is evaluated. As shown in FIG. 22A, 1.6% of the testing signals are hashed more than 2 bits away from their real accounts. Such fuzziness is mitigated by the separation of the hash codes of different classes, as shown in FIG. 22B, i.e., in 99% of the case the hash code of a signal of one account is at least three bits far away from the hash code of other accounts.

Figure 23B:
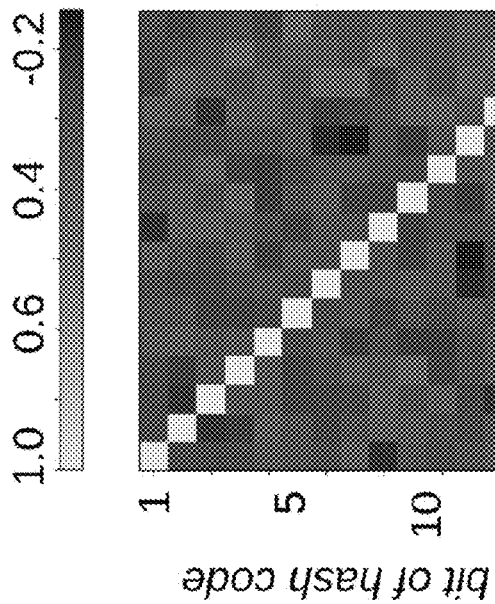
FIGS. 23A and 23B are graphical representations respectively showing the distributions of bits valued at "zero" and "one" and the correlation of each bit in the hash code, where the hash code size B is 16 bits.
Figure 23A:
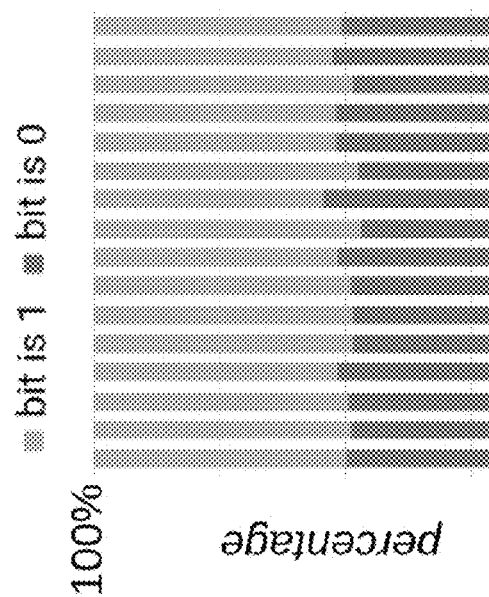
Figure 24:
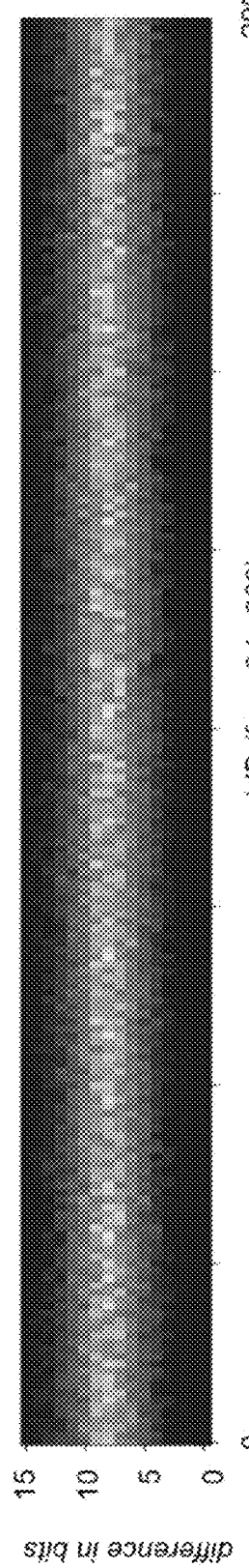
FIG. 24 is a graphical representation showing the distribution of the account hash code distance, where the column i is the distribution of the hamming distance for all accounts where i≠j.

Then, the manner in which the hash codes of all accounts are placed in the Hamming space is studied. First, the distribution of zero and one of each bit in the hash code generated in an experiment is shown in FIG. 23A. There are roughly an equal amount of zeros and ones in each bit, indicating that the hash codes are evenly spread. Second, the correlation of every bit pair is shown in FIG. 23B. In FIG. 23B, the correlation is close to zero for every pair of bit i and j when i≠j, indicating that each bit carries different information in the hash code. Third, the distribution of the distances of hash codes between any two accounts are shown in FIG. 24, where the minimum distance is 3 to 4 bits, the average is 7 to 8 bits, and the maximum is 13 to 14 bits. From this figure, it is illustrated that hash codes of the accounts are sparsely located in the Hamming space and the distance between any two accounts are at least a few bits away. This property of sparsity is the key for an identification system, and it comes from careful design of the regularizer.

Discussions

The present disclosure is designed as a pure convolutional neural network (CNN) on temporal normalized motion signals instead of a recurrent neural network (RNN) (which is commonly used in recent signature verification systems mainly for speed and simplicity). First, the present disclosure is essentially a way to input an account ID so it must be able to be retrained or fine-tuned within in a few minutes as new accounts are registered (which makes an RNN solution unsuitable). Second, it is difficult to fully learn the long term dependency of handwriting strokes with very limited data for an RNN. Third, to generate a hash code of fixed size representing the whole signal, an RNN needs to keep a large number of hidden states and use them to output the hash code after the last sample of the signal is processed, which further increases the difficulty of training because of the lengthy back-propagation-in-time process. Hence, a pure convolutional neural network solution as disclosed herein is a fine alternative to a recurrent neural network.

CONCLUSIONS

In this disclosure, a user login framework containing an multifactor authentication system and an identification system is described. The authentication system uses templates of both in-air-handwriting as well as hand geometry to match a login request to verify the identity of a user. The identification system can generate a compact binary hash code and efficiently locate an account in a database given a sample of in-air-handwriting of an ID string. The empirical results obtained from the present framework's evaluation demonstrate the feasibility of the described methods. The ability to convert a finger motion signal to fuzzy hash code gives the present framework great potential for sign-in over gesture input interface.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for identifying and authenticating a user, comprising:
   a hand motion tracking device, wherein the hand motion tracking device is operable for capturing a first position signal, a second position signal, and a hand geometry vector of a user's hand; and
   a processor in operative communication with the hand motion tracking device, the processor configured to execute instructions including:
   identifying an account associated with a first position signal, further comprising:
      generating a latent vector and a binary hash vector using the first position signal;
      identifying one or more candidate accounts using the binary hash vector;
      comparing the latent vector with a template latent vector associated with each of the one or more candidate accounts; and
      identifying an account associated with the template latent vector associated with one of the one or more candidate accounts which most closely matches the latent vector; and
   authenticating the user using the second position vector and the hand geometry vector, further comprising:
      defining a first distance value between the second position signal and a template position signal;
      defining a second distance value between the hand geometry vector and a template hand geometry vector; and
      evaluating an authentication request associated with the second position signal and the hand geometry vector based on the first distance value and the second distance value.

2. The system of claim 1, wherein the step of defining the first distance value between the second position signal and the template position signal further comprises:
   aligning the second position signal with the template position signal to produce an aligned position signal;
   obtaining an element-wise distance vector representative of a plurality of distance values between each of a plurality of samples of the aligned position signal and each of a plurality of samples of the template position signal;
   mapping each of the plurality of distance values to a match label; and
   aggregating each of the plurality of match labels associated with each of the plurality of distance values to produce a final signal level distance value.

3. The system of claim 1, wherein the authentication request associated with the second position signal and the hand geometry vector is accepted if the first distance value is below a threshold and wherein the authentication request is denied if the first distance value is above the threshold.

4. The system of claim 3, wherein each of the plurality of template hand geometry vectors and each of the plurality of template position vectors are updated implicitly upon acceptance of the authentication request.

5. The system of claim 1, wherein the step of identifying the account associated with the first position signal is at least partially performed using a neural network.

6. A system for identifying a user, comprising:
   a hand motion tracking device, wherein the hand motion tracking device is operable for capturing a position signal of a user's hand; and
   a processor in operative communication with the hand motion tracking device, the processor configured to execute instructions including:
   generating, by the processor, a latent vector associated with the position signal;
   quantizing the latent vector to obtain an associated binary hash vector;
   searching a hash table using the binary hash vector to obtain one or more candidate accounts, wherein the hash table comprises a plurality of accounts and wherein each of the plurality of accounts is associated with a template binary hash vector and a template latent vector;
comparing the latent vector with each template latent vector associated with each of the one or more candidate accounts; and
identifying an account associated with the template latent vector associated with one of the one or more candidate accounts which most closely matches the latent vector.

7. The system of claim 6, wherein the steps of generating the latent vector and the binary hash vector associated with the position signal are performed using a neural network.

8. The system of claim 7, wherein the neural network comprises:
a plurality of convolutional and max-pooling layers;
a fully connected layer following the plurality of convolutional and max-pooling layers, wherein the output of the fully connected layer is the latent vector;
a projection layer, wherein the projection layer takes the latent vector as input and wherein the output of the projection layer is a projected vector; and
a softmax layer in parallel with the projection layer, wherein the softmax layer is operable for training the convolutional neural network.

9. The system of claim 8, wherein the hash vector is obtained from the projected vector by taking the sign of the projected vector for each of a plurality of elements of the projected vector.

10. The system of claim 6, further comprising preprocessing the position signal, wherein the steps of preprocessing the signal comprise:
applying linear interpolation to the position signal;
deriving a velocity value and an acceleration value for each of a plurality of samples of the position signal;
applying a low pass filter to the position signal;
translate a coordinate system of the position signal such that an axis of the position signal corresponds to an average pointing direction of the hand;
normalizing an amplitude of the position signal; and
downsampling the position signal.

11. The system of claim 6, wherein the user is authenticated upon identifying the nearest neighbor account using an authentication process, the authentication process comprising:
defining a first distance value between a second position signal and a template position signal associated with the nearest neighbor account;
defining a second distance value between a hand geometry vector and a template hand geometry vector associated with the nearest neighbor account; and
evaluating an authentication request associated with the second position signal and the hand geometry vector based on the first distance value and the second distance value.

12. The system of claim 6, further comprising a verification module, wherein the verification module is operable for verifying an accuracy of the identified account.

13. The system of claim 6, wherein a cryptographic hash vector associated with the template binary hash vector of each of the plurality of accounts is used to generate a key, wherein each of the plurality of keys is configured for encrypting information associated with one of the plurality of accounts.

14. A system for authenticating a user, comprising:
a hand motion tracking device, wherein the hand motion tracking device is operable for capturing a position signal and a hand geometry vector of a user's hand; and
a processor in operative communication with the hand motion tracking device, the processor configured to execute instructions including:
defining a first distance value between the position signal and a stored template position signal, further comprising:
aligning the position signal with the template position signal to produce an aligned position signal;
obtaining an element-wise distance vector representative of a plurality of distance values between each of a plurality of samples of the aligned position signal and each of a plurality of samples of the template position signal;
mapping each of the plurality of distance values to a match label; and
aggregating each of the plurality of match labels associated with each of the plurality of distance values to produce a final signal level distance value;
defining a second distance value between the hand geometry vector and a template hand geometry vector; and
evaluating an authentication request associated with the position signal and the hand geometry vector based on the first distance value and the second distance value.

15. The system of claim 14, further comprising preprocessing the position signal, wherein the steps of preprocessing the signal comprise:
applying linear interpolation to the position signal;
deriving a velocity value and an acceleration value for each of a plurality of samples of the position signal;
applying a low pass filter to the position signal;
translate a coordinate system of the position signal such that an axis of the position signal corresponds to an average pointing direction of the hand;
down-sampling the position signal; and
normalizing each of a plurality of columns of the position signal to zero mean and unit variance.

16. The system of claim 14, wherein the steps of aligning the position signal to the template position signal comprise:
applying dynamic time warping to the position signal and the template position signal to obtain a warping path; and
calculating each of a plurality of samples of the aligned position signal by determining an average of one or more samples of the position signal mapped to each of a plurality of samples of the template position signal on the warping path.

17. The system of claim 14, wherein the template position signal is associated with one of a plurality of accounts and wherein the account is chosen using an identification process, the process comprising:
generating a latent vector and a binary hash vector associated with a second position signal;
identifying one or more candidate accounts using the binary hash vector;
comparing the latent vector with each template latent vector associated with each of the one or more candidate accounts; and
identifying an account associated with the template latent vector associated with one of the one or more candidate accounts which most closely matches the latent vector.

18. The system of claim 14, wherein the aggregation step further comprises determining a signal length differential value, and wherein the signal length differential value is representative of a difference in a signal length of the position signal and a signal length of the template position signal.

19. The system of claim 18, wherein the signal length differential value and the second distance value are each given respective weights when evaluating the authentication request.

20. The system of claim 14, wherein the authentication request associated with the position signal and the hand geometry vector is accepted if the first distance value is below a threshold and wherein the authentication request is denied if the first distance value is above the threshold.

* * * * *